Sept. 25, 1951 J. LANCHART 2,569,179
FOOD HANDLING SPOON
Filed Feb. 18, 1949
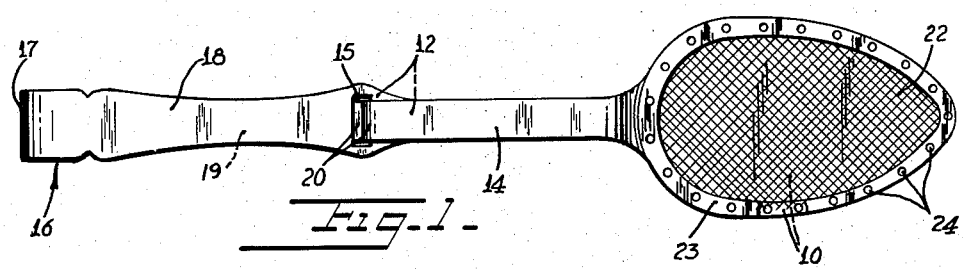
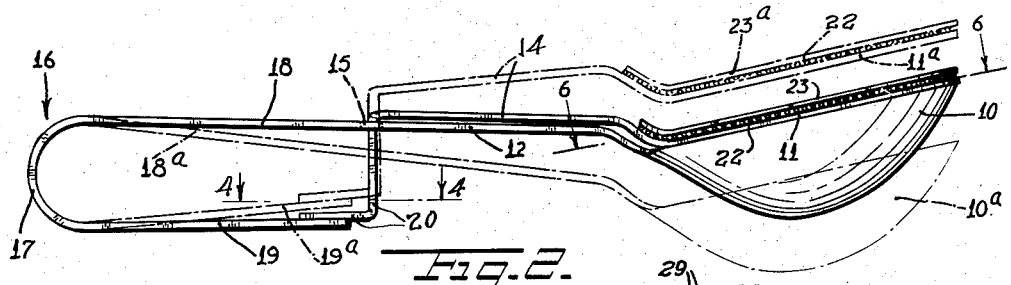
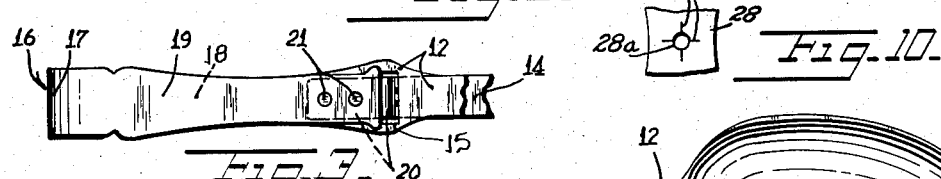
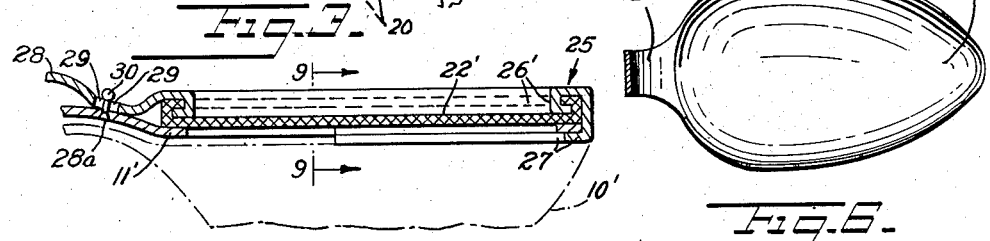
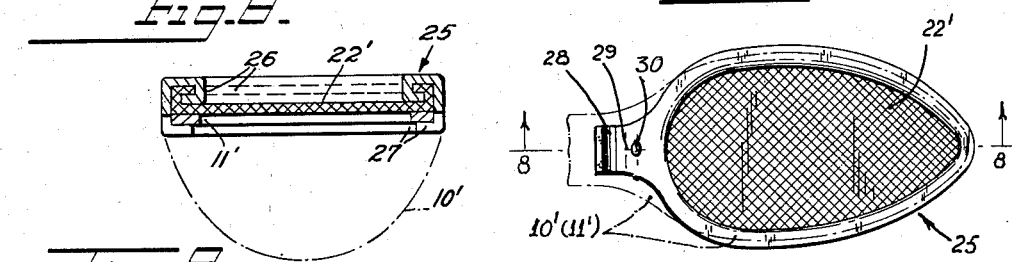
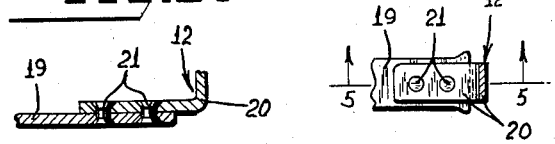
INVENTOR.
JACK LANCHART
BY
ATTORNEY Patented Sept. 25, 1951

2,569,179

UNITED STATES PATENT OFFICE 2,569,179

FOOD HANDLING SPOON

Jack Lanchart, Brooklyn, N. Y.

Application February 18, 1949, Serial No. 77,221

4 Claims. (Cl. 7—1)

This invention relates to new and useful improvements in food handling implements, and, more particularly, the aim is to provide a novel and valuable implement for use in the kitchen and/or at a serving or dining table.

More specifically, the invention provides an improved spooning implement so constructed and arranged that there are carried by a single spoon handle an underlying spoon and an overlying frame-like member, with those two elements respectively carried at the forward ends of longitudinal supports or shank portions and with such shanks extended away from the spoon for prolongation to participate jointly in forming the outer end portion of the handle; and in combination with the features just explained one of said shanks is at its outer end preferably bent into a substantially Z-shaped terminal formation so that the middle limb of the Z may substantially vertically cross the other shank for securement to an end of a prolongation of the shank last-named.

With this arrangement, and with the butt end of the handle constituted by a curvilinearly and substantially semi-circularly arched intermediate portion of the last-named shank prolongation thereby forwardly to extend the end portion of said last-named shank prolongation for the securement above stated, and with the said arched portion of the other shank of resilient material, as of a resilient metal, an implement is provided wherein the upper frame-like member is normally resiliently urged to flatwise extension over and close to the upper rim of the lower spoon element. Thus when the handle is squeezed, the two elements separate, to provide a seizing instrumentality, and when the squeezing pressure is relieved the two elements come together again, tongs-fashion.

The new implement, therefore, can be used to grasp a fish, a part of a chicken, a steak or any food piece, and lift the same out of a pot, frying pan or the like without piercing the food.

Said implement, also, can be used for the serving of gravies and the like out of a cooking or table utensil; and in this connection a preferred feature of the invention is the addition to the frame-like member of a foraminous wall, as one of wire-mesh, for providing a strainer-means functionable incidental to such a serving. This straining means can be permanently carried by the frame-like member or omitted entirely from the implement, or detachably carried thereby.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of a now favored embodiment of the food handling spoon constructed in accordance with the present invention.

Fig. 2 is a side elevation thereof; the parts being shown in full lines in normal relation, and in dot and dash lines with the frame-like member raised off the spoon.

Fig. 3 is a bottom plan view of the outer end portion of the handle.

Fig. 4 is a fragmentary horizontal section, taken on the line 4—4 of Fig. 2.

Fig. 5 is a slightly enlarged vertical section, taken on the line 5—5 of Fig. 4.

Fig. 6 is a substantially horizontal section, taken on the line 6—6 of Fig. 2, showing the spoon in top plan.

Fig. 7 illustrates a modification, characterized by the inclusion of a strainer-means adapted for ready attachment to the upper frame-like member, and for ready detachment therefrom as for the purpose of facilitating thorough cleaning of all the implement parts or for use of the implement with a strainer-means omitted; in this view the matching outlines of the frame-like member and the spoon are indicated in dot and dash lines.

Fig. 8 is an enlarged longitudinal sectional view taken on the line 8—8 of Fig. 7.

Fig. 9 is an enlarged transverse sectional view taken on the line 9—9 of Fig. 8.

Fig. 10 is an enlarged detailed view of a portion of the tab showing the aperture and related slits.

Referring to the drawings more in detail, and first to Figs. 1–6, the bottom spoon is designated 10, which it will be noted is of standard shape and over which a frame-like member 11 is positioned. Rearwardly rigidly extended from the spoon 10 and the frame-like member 11, respectively, are shank portions 12 and 14. The shank portion 12 has a transversely elongated slot 15.

The butt end portion 16 of the handle of the spoon 10 is shown as substantially semi-circularly arched as at 17, there being forwardly extended from such arching an upper handle extension 18 integral with the shank portion 12 and also a lower handle extension 19 having its free terminus substantially vertically below the slot 15. The rearward terminal portion 20 of the shank portion 14 is bent to form a substantially Z-shaped extension, and the middle limb of such Z substantially vertically crosses the shank portion 12 by passage through the slot 15. The bottom terminal limb of said Z lies on the forward end portion of the extension 19 and is there secured by a pair of rivets 21 countersunk at both ends so as to establish easily cleanable flush surfaces as shown best in Fig. 5.

As has already been said, a strainer-means may be omitted, but such means is here shown as permanently including a wire-mesh sheet 22. Said sheet may be secured to the frame-like member 11 in any suitable and practicable way, but this securement, as herein illustrated by way of example, is provided for by adding a sheet metal stamping 23 conforming substantially in frame-like character to the frame-like member 11. The sheet 22 around its margin is sandwiched between the frame-like member 11 and the stamping 23, and a suitable number of clamping and bonding means are employed, for instance, spot weldings as indicated at 24 in Fig. 1.

Normally, the parts are disposed as shown in full lines. With the outer end portion of the handle grasped in the hand, however, the extensions 18 and 19 of the outer end portion of the handle may be squeezed together, as for causing them to assume the dispositions indicated in dot and dash lines in Fig. 2 at 18ª and 19ª, thereby to separate the spoon 10 and the frame-like member 11, as indicated at 10ª and 11ª in dot and dash lines in Fig. 2. Immediately on relieving such squeezing force, the spoon 10 and the frame-like member 11 automatically seek to restore themselves to the relation shown in full lines in Fig. 2, and so gently but adequately arrive at dependable grasping engagement relative to the piece of food selected. Similarly, the implement may be used for ladling and serving a gravy or the like.

Referring to the modification shown in Figs. 7 to 10, and wherein the parts to which are applied reference numerals with primes added correspond, respectively, to the parts to which in Figs. 1 and 2 are applied reference numerals without primes, the sheet 22' of wire-mesh is gripped all around its perimetral margin, in a manner analogous to that employed so efficiently and inexpensively in the strainer and sieve manufacturing art, in a substantially oval-shaped "ring" 25; this ring being downwardly and then inwardly laterally curled all around its inner periphery as indicated at 26, there for gripping the sheet 22'. The ring 25 is laterally extended around the end thereof which is somewhat pointed to conform to the outer end of the frame-like member 11' and also part way along both sides of the frame-like member 11', for there providing a downwardly and then inwardly projected flange 27 for slip-in attachment to the frame-like member 11' as shown in Figs. 8 and 9 when said ring is endwisely applied to the frame-like member 11' at the end of the ring 25 carrying an upstanding tab 28 shaped for extension as best shown in Fig. 8.

Said tab 28 adjacent to its root portion is pierced by a suitable aperture 28ª from which are extended oppositely located slits 29. These provisions are for permitting ready passage through the aperture 28ª of the rounded upper head of a stud 30 suitably carried at the location shown on the shank 14 of the frame-like member 11' by snap yield of the tab-28-adjacent material of the ring 25 at the slits 29; this material being one of sufficient resiliency to allow the action just described. When the strainer sheet 22' together with its carrier ring 25 is to be removed, as when it is desired to clean the implement thoroughly in all its parts, the tab 28 serves as a finger-piece for disengagement of the ring 25 from the stud 30.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a kitchen utensil having a spoon and an upper frame-like member overlying the spoon and having a shank portion projecting radially from one side of the frame-like member, a strainer for releasable attachment to the top face of the upper frame-like member, said strainer comprising a ring overlying the upper frame-like member and corresponding to the shape thereof, a wire mesh mounted across said ring, a tab projecting laterally from one side of said ring and overlying the shank portion of the upper frame-like member, and means releasably attaching said tab to the shank portion of the frame-like member for mounting said ring in position thereon.

2. In a kitchen utensil having a spoon and an upper frame-like member overlying the spoon and having a shank portion projecting radially from one side of the frame-like member, a strainer for releasable attachment to the top face of the upper frame-like member, said strainer comprising a ring overlying the upper frame-like member and corresponding to the shape thereof, a wire mesh mounted across said ring, a tab projecting laterally from one side of said ring and overlying the shank portion of the upper frame-like member, and means releasably attaching said tab to the shank portion of the frame-like member for mounting said ring in position thereon, said releasable attaching means comprising a headed stud projecting upwardly from the top face of the shank portion of the upper frame-like member, said tab being formed with an aperture through which the head of said stub is to be snapped.

3. In a kitchen utensil having a spoon and an upper frame-like member overlying the spoon and having a shank portion projecting radially from one side of the frame-like member, a strainer for releasable attachment to the top face of the upper frame-like member, said strainer comprising a ring overlying the upper frame-like member and corresponding to the shape thereof, a wire mesh mounted across said ring, a tab projecting laterally from one side of said ring and overlying the shank portion of the upper frame-like member, and means releasably attaching said tab to the shank portion of the frame-like member for mounting said ring in position thereon, and means attaching said ring at the side of the frame-like member opposite the side from which said tab projects to hold said ring against lateral shifting about said releasable attachment means as a pivot.

4. In a kitchen utensil having a spoon and an upper frame-like member overlying the spoon and having a shank portion projecting radially from one side of the frame-like member, a strainer for releasable attachment to the top face of the upper frame-like member, said strainer comprising a ring overlying the upper frame-like member and corresponding to the shape thereof, a wire mesh mounted across said ring, a tab projecting laterally from one side of said ring and overlying the shank portion of the upper frame-like member, and means releasably attaching said tab to the shank portion of the frame-like member for mounting said ring in position thereon, said releasable attaching means comprising a headed stud projecting upwardly from the top face of the shank portion of the upper frame-like member, said tab being formed with an aperture through which the head of said stud is to be snapped, and a downwardly and inwardly extended flange formed on said ring opposite said tab for engagement with said frame-like spoon for holding said ring against lateral shifting relative to the upper frame-like spoon about said headed stud as a pivot.

JACK LANCHART.

REFERENCES CITED

The following references are of record in the file of this patent:

UNITED STATES PATENTS

| Number | Name | Date |
| --- | --- | --- |
| 1,643,456 | James | Sept. 27, 1927 |
| 2,010,074 | Fuerst | Aug. 6, 1935 |
| 2,455,623 | Stone | Dec. 7, 1948 |

FOREIGN PATENTS

| Number | Country | Date |
| --- | --- | --- |
| 49,105 | Denmark | July 28, 1934 |